C. W. WEISS.
INTERNAL COMBUSTION ENGINE.
APPLICATION FILED MAR. 30, 1916.
1,219,512. Patented Mar. 20, 1917.
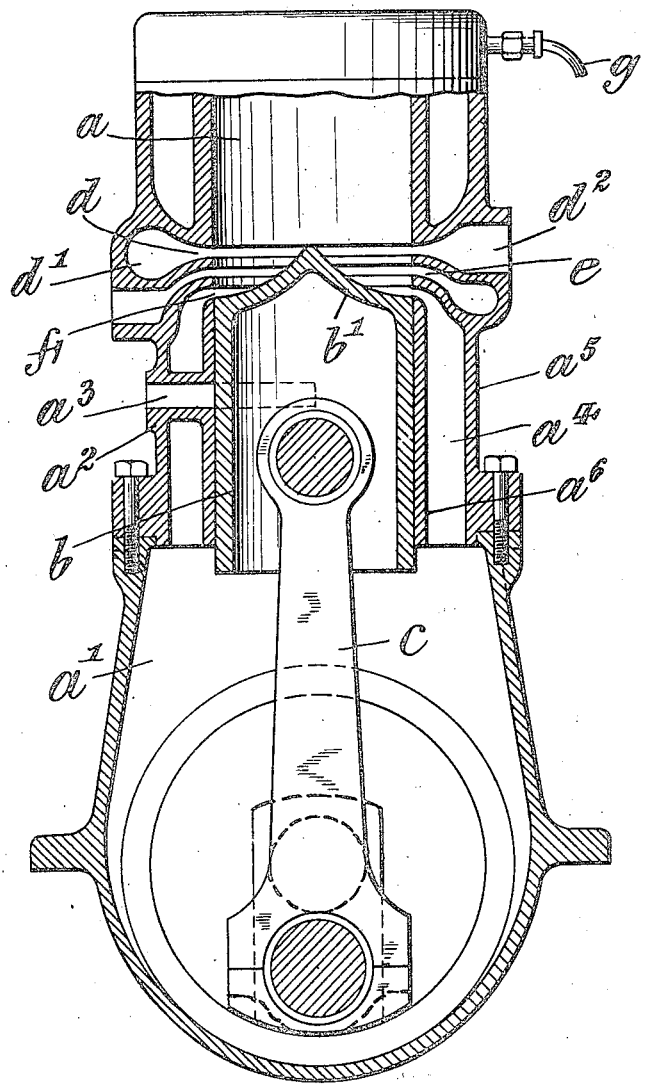
WITNESS
INVENTOR
Carl W. Weiss
BY
ATTORNEYS

UNITED STATES PATENT OFFICE.

CARL W. WEISS, OF BROOKLYN, NEW YORK.

INTERNAL-COMBUSTION ENGINE.

1,219,512.  Specification of Letters Patent.  Patented Mar. 20, 1917.

Application filed March 30, 1916. Serial No. 87,662.

*To all whom it may concern:*

Be it known that I, CARL W. WEISS, a citizen of the United States, residing in the borough of Brooklyn of the city of New York, in the State of New York, have invented certain new and useful Improvements in Internal-Combustion Engines, of which the following is a specification, reference being had to the accompanying drawing, forming a part hereof.

This invention relates to internal combustion engines and is concerned particularly with the improvement of engines of the two-cycle type. The principal object of the invention is to improve the construction of such an engine so as to increase the efficiency thereof and adapt it for high speed operation at high mean effective pressures. It is concerned further with the effective scavenging of the cylinder by means of a suitable fluid, such as air which, during the scavenging operation, is protected against pollution by the burnt gases and, after scavenging, remains in the cylinder in pure condition, for association with the fuel. Still another object of the invention is to improve the construction and relative disposition of the exhaust, induction and scavenging ports of a two-cycle engine so as to afford a relatively quick, unretarded discharge of the burnt gases, a free induced influx of a supplemental scavenging medium and an abrupt introduction of scavenging air at low pressure and during a minimum time represented by the shortest possible piston travel. The invention further contemplates the introduction into the cylinder of a supplemental scavenging medium and the scavenging air in such relation to one another as to cause the inrushing scavenging air to induce the said medium and this medium, whatever may be its character, and the scavenging air are formed in concentric strata within the cylinder so that, while the air serves its intended function of displacing the burnt gases, it is shielded from direct contact with these gases by the interposed envelop formed of the induced medium. In realizing the last named object, it has been recognized that the most efficient scavenging actions in engines are obtained wherein eddies and whirls are reduced to a minimum. Accordingly, not only are the ports of peculiar construction and arranged in novel relationship to one another, but the piston head itself is of such form as to direct the inflowing gases along straight paths and prevent the setting up of eddies during the scavenging period. Still another feature of the improved engine resides in the utilization of the induced medium for cooling purposes to the end that the known difficulties in the effective cooling of two-cycle engines may be met to the greatest extent possible and operation of the engine under high pressures and high speeds be carried on with adequate lubrication. The advantages derived by the improvements noted briefly above will be set out at greater length in connection with the description of the structural features of the invention as they appear in the accompanying drawing, which shows, partly in vertical section and partly in elevation, a two-cycle engine constructed for operation in accordance with the invention.

It will be evident, as this description proceeds, that the invention is not limited in its application to engines using any particular kind of fuel, since equally good results may be obtained with the introduction of heavy oil or a light, volatile oil and with air, steam or any equivalent charge combining with the scavenging medium. Further, it is to be noted that the character of the engine, in so far as concerns the charge igniting means, is immaterial.

In the accompanying drawing, which shows one practical embodiment of the invention, there has been illustrated a two-cycle engine intended to be operated by a charge of air, steam and oil, the compression of which is carried to ignition temperature. The principle of the invention will appear clearly from a detailed description of this illustrative embodiment. In the cylinder $a$ is disposed the reciprocating piston $b$, the power of which is delivered through a pitman $c$ in the usual manner. This particular engine is valveless, so that the two strokes of operation are brought about automatically by the control of the ports by the piston $b$. The improved ports are formed in the cylinder walls and are annular in form, the exhaust $d$ being formed directly above the annular induction port $e$ through which the air or steam enters the cylinder, while the annular scavenging port $f$ is disposed directly beneath the induction port $e$ and communicates with the crank case $a'$ of the engine. In the cylinder wall $a^2$ is cast a port $a^3$ adapted to be uncovered by the skirt of the piston $b$ when the piston is approaching its upper dead center, whereby the port $a^3$ communicates with the crank case $a'$ and admits a quantity of air or other fluid for a purpose to be described. The fluid thus admitted through the port $a^3$ may be taken in at atmospheric pressure by the suction in the crank case created by the upwardly traveling piston or, where desirable, a compressor of some sort may be attached thereto so as to introduce the air under pressure. The scavenging port $f$ is placed in free communication with the crank case $a'$ by an annular channel $a^4$ formed in the engine casing between the outer wall $a^5$ and the cylinder wall $a^6$, as will be convenient. In order to direct the air, steam or other fluid flowing in through the ports $e$ and $f$ and effect the most advantageous disposition of such fluid as will appear more clearly in connection with the description of the operation, the piston head $b'$ is formed of substantially conical outline, the cross sectional contour of the face being, preferably, of parabolic form, as shown.

The improved features of the engine can be most easily described in connection with its operation. The piston $b$ on the working stroke moves downwardly until its upper edge uncovers abruptly the entire annular exhaust port $d$ thereby permitting the burnt gases, under pressure, to rush into the enlarged annular exhaust space $d'$ and from thence into the exhaust outlet $d^2$. The area of the exhaust port by reason of its annular form is very great compared to ports commonly used and the control of the port by the piston in the manner described insures the opening of this great area very rapidly so that the discharge of practically all of the products of combustion is effected instantaneously and by a very rapid and unretarded outflow. This quick discharge is recognized as the most desirable one from an engineering view, especially in two-cycle engines, since it permits such a sudden outrush of gas under high pressure as to insure the instantaneous discharge of practically all of the burnt gases and brings about, during a minimum travel of the piston, a corresponding drop in temperature. In this way, it may be said that the improved exhaust affords in itself, during a minimum piston travel, a cooling effect which is highly conducive to efficient operation at high speeds and high pressures. After uncovering the annular exhaust port $d$ and permitting the outrush of most of the burnt gases through the large unrestricted port, the piston $b$, a moment later, overruns the induction port $e$, the general outline and dimensions of which may be substantially similar to the outline and dimensions of the exhaust port. It will be understood, that whether air, steam or some other fluid be introduced into the cylinder through the annular induction port $e$, it will be desirable to have this port of as great area as possible so as to permit the inflow of gas with the least possible retardance. Continuing its downward travel, the piston overruns the annular scavenging port $f$ and thereby places the crank case $a'$ in free communication with the interior of the cylinder. The piston $b$ at its lower dead center preferably has its upper edge exactly on a level with the lower peripheral edge of the port $f$ so that the air or other scavenging medium travels along the inclined face $b'$ of the piston and is directed centrally of the cylinder toward the apex of the piston head where by reason of the parabolic curvature of the head it continues its upward travel along a path substantially concentric with the longitudinal axis of the cylinder. This change of direction of the scavenging medium from the time it passes through the annular port $f$ to the time it passes upwardly in the cylinder is brought about so gradually by the curvature of the piston head $b'$ that it suffers no disturbance and there is no tendency for the creation of eddies or whirls, such as have been found disadvantageous in scavenging mediums for reasons noted. The scavenging gas which is discharged through the annular port $f$ enters the cylinder under relatively high pressure by reason of its compression in the crank case $a'$ and, being directed along a path in juxtaposition to the path of the inflowing charge from the induction port $e$, impresses a very great inductive force on the additional scavenging medium and thereby accelerates its introduction into the cylinder. The fluid from the induction port $e$ being influenced, to the extent noted, by the scavenging air, follows the path of the latter and so passes upwardly in the cylinder along a path parallel to the axis of the cylinder. Since the scavenging air is directed centrally of the cylinder and since the induced charge enters in an annular stream it will envelop the scavenging air and move upwardly in the cylinder in an annular stratum immediately surrounding the centrally disposed quantity of scavenging air. Between this annular stratum and the cylinder wall are disposed the outrushing remnants of burnt gases, but these burnt gases, while displaced by the inflowing scavenging air and supplemental scavenging medium, are prevented from commingling with the scavenging air by the envelop of steam, air or other "neutral" gas interposed between the scavenging air and the burnt gases in the manner described. This effective separation of the burnt gases and the scavenging air is greatly enhanced by the absence of eddies and whirls in the body of the "neutral" gas and air, these eddies being prevented in the manner hereinbefore set forth. As the body of "neutral" gas and air continues upwardly in the cylinder the remaining exhaust gases are effectively forced therefrom and the next cycle of operations is ready to be commenced. On the compression stroke, the annular ports $f$, $e$ and $d$ are closed successively and the charge is compressed to the ignition temperature, the heavy fuel oil being sprayed in, in the engine shown, through the supply pipe $g$. It is on this compression stroke that the skirt of the piston $b$ overruns the port $a^3$ and the suction created by the piston in the crank case $a'$ induces a fresh charge of scavenging air or other fluid.

It will now be evident from the foregoing description that the principle of the invention may be embodied in two-cycle engines varying in structural detail and falling in several types of two-cycle engines now commonly known. The form, dimensions and arrangement of parts may be changed provided the described action and all of the attendant advantages are retained.

In the type of engine shown and described air will generally be introduced through the port $a^3$ and steam will be passed in through the induction port $e$. This steam will serve as a very effective envelop for the separation of the burnt gases and the scavenging air and will also, by reason of its specific heat, serve as an admirable cooling medium for the interior of the cylinder and surrounding parts. However, in a different type of engine, such as employs light, volatile oil, like gasolene, the hydrocarbon mixture would be introduced through the scavenging port $f$ from the crank case $a'$ and an additional quantity of air, steam or other suitable fluid would pass in through the induction port $e$. In an engine of this type, the described principle of operation would be wholly effective as the explosive mixture which is directed toward the center of the cylinder would be effectively shielded from the burnt gases by the interposed annular stratum of air, steam or the like, as indicated. In this way, the efficiency of the motor is maintained at a maximum since the charge is not polluted by non-explosive waste products.

While it has been sought to indicate throughout this specification the departures which may be made from the illustrated embodiment, without losing the advantages to be gained by the employment of the invention, the scope thereof will be defined more clearly by the appended claims.

I claim as my invention:

1. In a two-cycle internal combustion engine, annular exhaust, scavenging and induction ports formed in the wall thereof in juxtaposition to one another.

2. In a two-cycle internal combustion engine, annular exhaust, scavenging and induction ports formed in the wall thereof in juxtaposition to one another and adapted to be overrun by the piston.

3. In a two-cycle internal combustion engine, annular exhaust, scavenging and induction ports formed in the wall thereof in juxtaposition to one another and adapted to be overrun by the piston, and a tapered piston head to direct the inflowing fluid centrally in annular streams.

4. In a two-cycle valveless internal combustion engine, annular exhaust, scavenging and induction ports formed in the wall thereof in juxtaposition to one another and adapted to be overrun and controlled by the piston.

5. In a two-cycle internal combustion engine, annular exhaust, scavenging and induction ports formed in the wall thereof in juxtaposition to one another, the scavenging port communicating with the crank case and an inlet port in the crank case for a scavenging medium.

6. In a two-cycle internal combustion engine, annular exhaust, induction and scavenging ports formed in the wall thereof in juxtaposition to one another and arranged one below another, respectively, the scavenging port being lowermost.

7. In a two-cycle internal combustion engine, annular exhaust, induction and scavenging ports formed in the wall thereof in juxtaposition to one another and arranged one below another, respectively, the scavenging port being lowermost, and a tapered piston head, the peripheral edge of which is disposed opposite the scavenging port at the lower dead center of the piston.

8. In a two-cycle internal combustion engine having a cylinder wall and an engine wall, annular exhaust, scavenging and induction ports formed in juxtaposition to one another, and an annular passage between the cylinder wall and engine wall extending from the scavenging port to the crank case.

9. In a two-cycle internal combustion engine having a cylinder wall and an engine wall, annular exhaust, scavenging and induction ports formed in juxtaposition to one another and adapted to be overrun and controlled by the piston, an inlet port in the crank case for a scavenging medium, and an annular passage between the cylinder wall and engine wall extending from the scavenging port to the crank case, whereby on the down-stroke of the piston the scavenging port is overrun and the scavenging medium compressed in the crank case is forced from the scavenging port into the cylinder.

10. The method of scavenging a two-cycle internal combustion engine which consists in directing the scavenging medium centrally of the cylinder in an annular stream when the piston approaches its lower dead center, forming an annular fluid envelop about such scavenging medium and permitting the concurrent discharge of the exhaust gases in an annular stream along the cylinder wall to the exhaust port.

This specification signed this 29th day of March, A. D. 1916.

CARL W. WEISS.